United States Patent [19]

Chandler

[11] 4,190,281
[45] Feb. 26, 1980

[54] BALLAST FOR PICK-UP TRUCKS AND THE LIKE

[76] Inventor: Steven G. Chandler, 1010 E. Warren, Bucyrus, Ohio 44820

[21] Appl. No.: 955,803

[22] Filed: Oct. 30, 1978

[51] Int. Cl.² ............................................. B62D 33/04
[52] U.S. Cl. ..................................... 296/37.6; 280/759
[58] Field of Search .................. 296/24 R, 37.1, 37.6; 280/759; 114/91.1, 121

[56] References Cited
U.S. PATENT DOCUMENTS 3,727,971   4/1973   Sisler ..................................... 296/37.6
3,940,178   2/1976   Leveque .......................... 296/37.6 X Primary Examiner—Joseph F. Peters, Jr.
Assistant Examiner—Michael Mar
Attorney, Agent, or Firm—W. Preston Hickey

[57] ABSTRACT

The invention recognizes that the areas of the load carrying bed of a pick-up truck between the rear wheel wells and vertical framing are not particularly accessible for payload. The ballast fits into this space in a manner which automatically locks it in place by reason of its shape. The preferred arrangement can be filled with sand so that its weight can be inexpensively and conveniently changed to fit changing circumstances.

7 Claims, 6 Drawing Figures

BALLAST FOR PICK-UP TRUCKS AND THE LIKE

BACKGROUND OF THE INVENTION

The present invention relates to ballast for vehicles of the type having side panels with a turned down angular member extending inwardly over a cargo bed; and more particularly to ballast for pick-up trucks and the like.

Trucks and particularly pick-up trucks are designed to carry loads many times heavier than their own weight. Consequently, the load springs do not provide good riding qualities when the truck is in the unloaded condition. In some instances, where helper springs are used, the helper springs will be out of engagement with their abutments in the unloaded condition of the truck, and during traverse of bumpy roads, the springs may suddenly go into engagement with their abutments to give a sharp bottoming effect. Another problem which exists is called "planning". It is known that lightly loaded wheels when skidding over wet pavement may lift the tire up off of the pavement so that most of the traction is lost. Added weight on tires can also greatly increase traction on snow and ice.

An object of the present invention, therefore, is the provision of ballast for trucks and the like, which can be easily installed or removed and the weight of which can be easily changed. Preferably, the ballast should not interfere with the load carrying space.

Another object of the present invention is the provision of ballast which can be shoved into position on a truck in a manner which will automatically lock the tank in place.

A further object of the present invention is the provision of ballast of the above described types which is simple in construction, efficient in its operation, and inexpensive to manufacture.

Still further objects and advantages of the invention will become apparent to those skilled in the art from the following description of applicants' preferred embodiments described with reference to the accompanying drawings.

DECRIPTION OF THE PREFERRED EMBODIMENTS

According to principles of the present invention, it is recognized that the use of the areas between the rear wheel wells and vertical framing members of a pick-up truck would have particular advantages if they could be used to carry ballast. According to principles of the present invention, a ballast configuration is provided which not only utilizes the available space without protruding into the payload area, but the configuration will automatically lock in place when the ballast of the present invention is slid into position. It is, of course, highly desirable that the ballast not shift forwardly or rearwardly during deceleration and acceleration, and not shift laterally during turns; and this is accomplished automatically by reason of the shape of the ballast about to be described.

Figure 1:
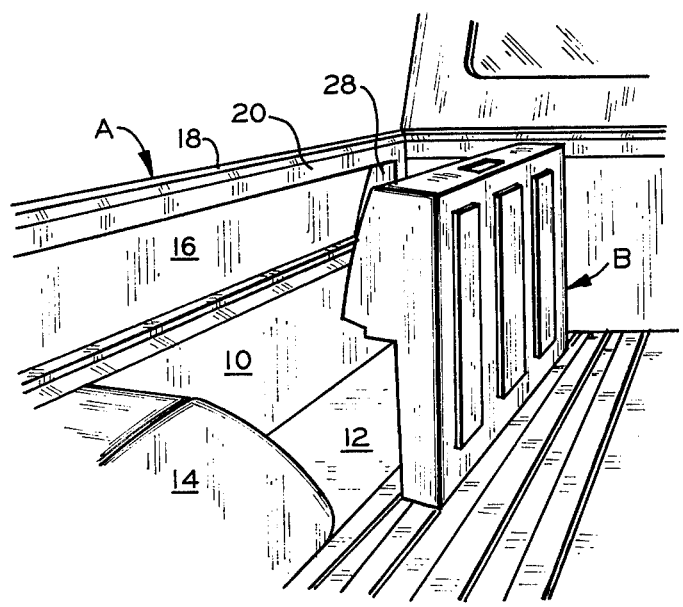
FIG. 1 is an isometric view of the front left corner of the bed of a pick-up truck with the ballast of the present invention about to be installed.

FIG. 1 of the drawings shows the ballast sitting in the payload area where it can easily have its weight increased by pouring sand therein.

Figure 2:
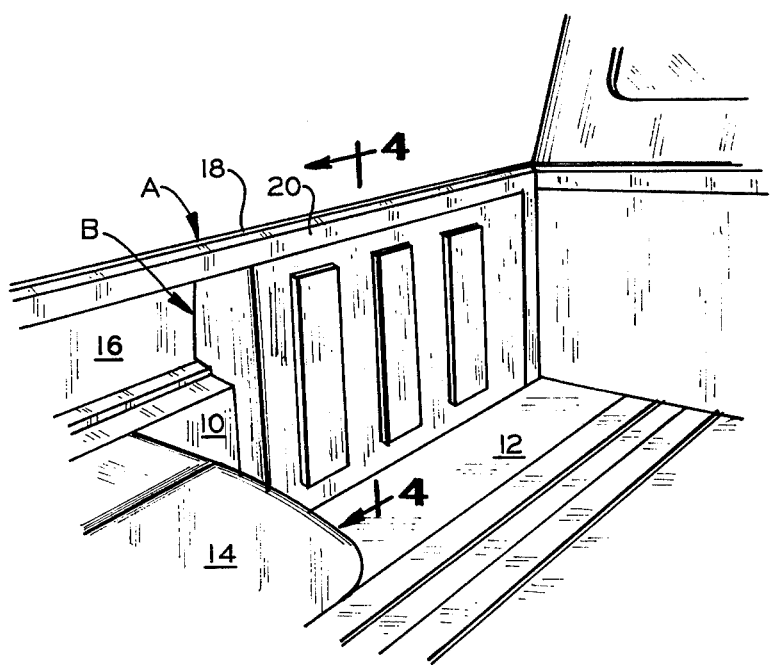
FIG. 2 is an oblique view showing the ballast installed in the front left corner of the pick-up truck.

FIG. 2 shows the ballast moved into position where it is out of the payload area and is restrained against the actions described above.

It will be understood that the side panels of pick-up trucks will vary somewhat in shape with the different makes and models. It will also be apparent from an understanding of the principles, by which the ballast shown in the drawings is constructed, how changes can be made to adapt the ballast for other makes and models of pick-up trucks.

The truck shown in the drawings has a partial inside liner 10 for the bed A which extends upwardly from the floor 12 to an elevation corresponding generally with the top of the wheel well 14. The outside wall 16 of the cargo bed extends upwardly in a sweeping curve to a top horizontal inward projection 18 that terminates in a downwardly turned flange 20 which trims off the upper edge of the cargo bed. The partial lining 10 has a width that is only a fraction of the width of the wheel wells 14 and serves the purpose of preventing the cargo from denting or damaging the exterior sheet metal wall 16 of the cargo bed. It will be recognized that all pick-up trucks have generally the same elements above described, but that they will be contoured and portioned somewhat differently.

Figure 3:
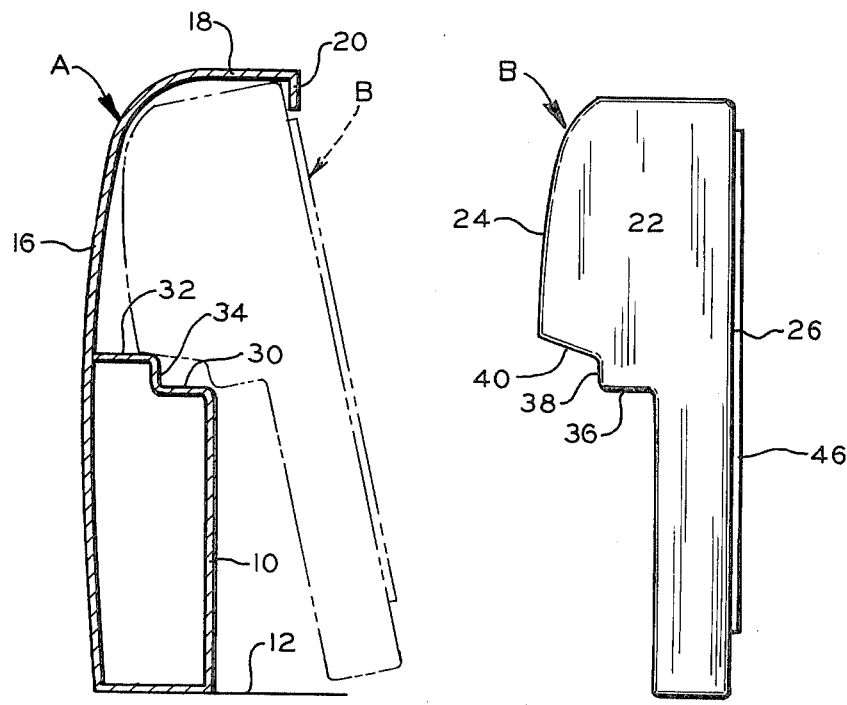
FIG. 3 is a schematic sectional view showing the tank before and during the installation against the side of the pick-up truck.
Figures 4, 5, 6:
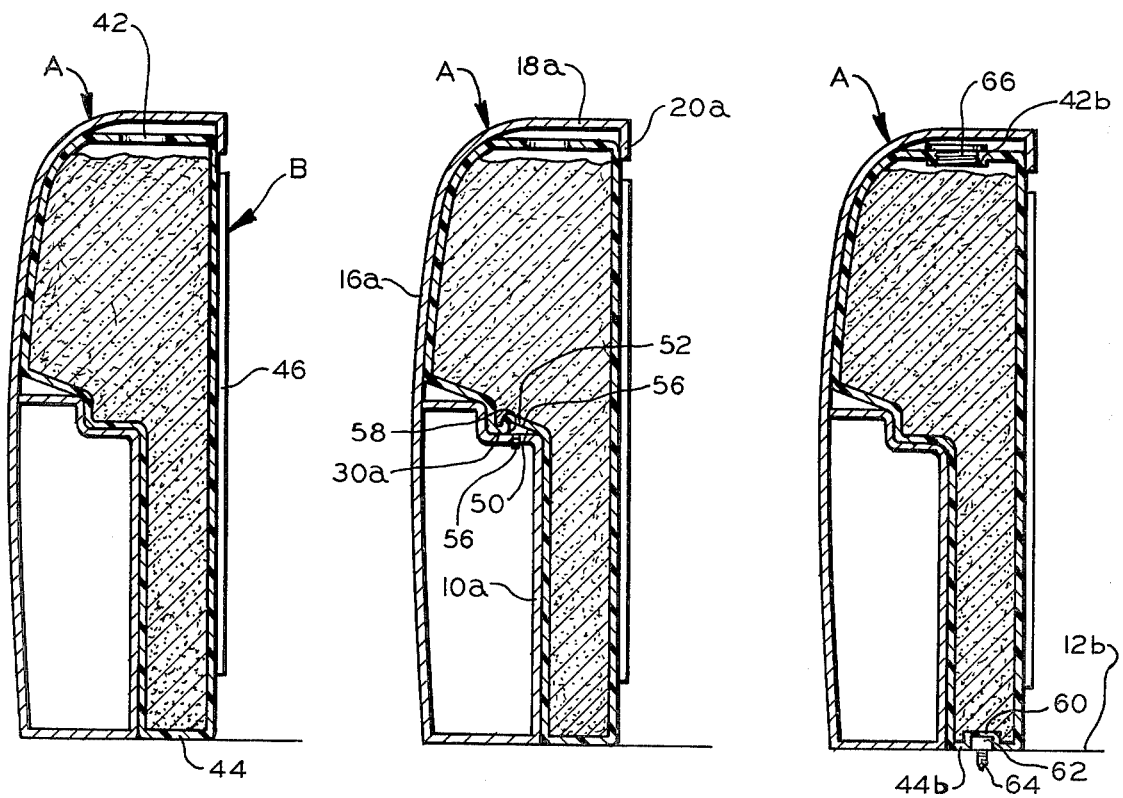
FIG. 4 is a sectional view of the ballast and adjacent portions of the pick-up truck.
FIG. 5 is a view similar to FIG. 4, but showing a slightly different embodiment.
FIG. 6 is a view similar to FIG. 4, but showing still another embodiment of the invention.

Referring now to FIGS. 3 and 4 of the drawings, the ballast B of the present invention takes the form of a hollow container 22 having outer and inner major side surfaces 24 and 26, respectively, and which have a length which corresponds to the distance between the front of the wheel well 14 and the vertical reinforcing 28 at the front corner of the truck bed. The outer and inner major side surfaces 24 and 26 have a height that is greater than the distance between the bottom of the inside flange 20 and the floor 12, but which has sufficient clearance with respect to the inwardly curved portions 18 so that the ballast B can be tipped in the manner shown in FIG. 3, to pass behind the flange 20. The outer major side surface 24 is shaped to conform generally to the inside surface of the wall 16 and side liner 10, so that the ballast 22 will fit generally flush in engagement therewith when the ballast is in a vertical position. In the embodiment of truck shown in the drawings, the inside liner 10 has a stepped ledge comprising the portions 30 and 32 which are separated by the rise 34. The outside major surface 24 of the ballast 22 is provided with a ledge 36 and a rise 38 which corresponds in shape to the partial ledge 30 and the rise 34, and has an upwardly and outwardly diverging portion 40 which will clear the top of the rise 34 when the ballast is in the inclined dot-dash position shown in FIG. 3. The incline 40 acts as a wedging surface for helping to support the weight of the ballast B during the time that the bottom of the ballast is slid laterally outwardly into its vertical position. The incline 40, of course, bears against the rounded corner between the portions 32 and 34 of the liner of the truck bed, to support the ballast as it moves laterally over irregularities that sometimes exist in the floor 12 of the bed.

As previously indicated, the ballast B is hollow, and contains an opening 42 in its top surface that is sheltered by the top ledge 18 of the pick-up bed. A preferred material for filling the ballast container 22 is sand, and the filling operation is preferably done when the ballast container 22 is in the general area shown by the solid line of FIG. 3 just inwardly of its installed position. It obviously is easier to transport buckets of sand up onto the pick-up bed than it is to move the ballast container 22 after it has been filled. Preferably, the container 22 is positioned just inwardly of the flange 20 so that when rocked outwardly, the top clears the flange, and come to rest upon the corner of the partial ledge 30. Thereafter, the container 22 can be moved upwardly by pinch bars, or the like, to the general position shown by the dot-dash lines of FIG. 3. The bottom of the ballast container is easily slid outwardly into the vertical position while the load is carried on the incline 40.

FIG. 4 of the drawings is a section through the side of the pick-up bed and container in the installed position. It will be seen that the opening 42 is automatically protected from the weather by reason of the bed portions 18 and 20. The ballast container 22 can be made from various materials, and as shown in the drawing, is made from glass fiber reinforced polyester which will bow slightly under the weight of the sand contained therein. The bowing action of the major surface 26 tends to lift the bottom 44 off of the floor 12 by a slight degree. This bowing action can be controlled or regulated by providing suitable stiffeners 46 which are molded in place. It will be seen that the tank so far described is out of the way of the cargo space, and is automatically locked in its vertical position by reason of the tank extending upwardly into the area behind the flange 20. Additionally, some of the weight of the ballast 22 sits upon the partial ledge 20 and/or bottom 44 to restrain the bottom from moving inwardly. This restraining action can be augmented, as shown for example, by the following embodiments.

The embodiment shown in FIG. 5 corresponds generally to the embodiment previously described,, but differs principally therefrom in that the portion of the ballast container 22 sits upon the partial leg 30 and contains a recess 50 for receiving a projection 52 that is installed on the partial ledge 30. Those portions of the embodiment shown in FIG. 5 which correspond to similar portions of the embodiment previously described are designated by a like reference numeral characterized further in that a suffix "a" is affixed thereto. The recess 50 is generally triangularly shaped and extends for the full length of the surface 36, so that it fits over a triangularly shaped strip 54 that is bolted in place by the fasteners 56. The right angle portion of the strip 54 faces outwardly to abut the vertical surface 58 of the recess 50 to positively lock the ballast container 22 upon the ledge 38.

The embodiment shown in FIG. 6 is generally similar to the embodiments previously described, but differs principally therefrom in that the bottom surface 44 of the tank is provided with a recess 60 which extends for the full length of the bottom and fits over a rectangular bar 62 that is fastened to the floor 12 by suitable bolts 64. Those portions of the embodiments shown in FIG. 6 which correspond generally to portions of the embodiments previously described are designated by a like reference numeral characterized further in that a suffix "b" is affixed thereto. It will be apparent that the recesses 50 and 60 need not be continuous, but that they can be shaped to surround suitable bolt heads and the like fastened to the ledge 30a and floor 12b, respectively.

In this embodiment, the opening 42b is threaded, and a plug 66 is threaded therein to provide an airtight seal for the tank. This may be provided in the other embodiments also.

It will be apparent that the objects heretofore enumerated as well as others have been accomplished and that there has been provided a ballast arrangement which is self-locking, is protected from the weather, and is unobtrusively located.

While the invention has been described in considerable detail, I do not wish to be limited to the particular embodiments shown and described; and it is my intention to cover hereby all novel adaptations, modifications, and arrangements thereof, which come within the practice of those skilled in the art to which the invention relates.

I claim:

1. Ballast for a pick-up truck and the like having a cargo bed with a floor, side panels each having a horizontal top portion, spaced apart vertical members along the side panels, and a turned down angular member projecting inwardly from the top portion of said side panel, said ballast comprising: a container having inner and outer major container sides, end sides and a top and bottom for the container; said inner and outer container sides generally conforming in length to the space between the spaced apart vertical members; said inner side conforming in shape to the shape of the side panel with which it is to abut, and said ends and top having a width conforming to the width of said top portion between said panel and said inward projection of said turned down angular member, and whereby said container can be inclined outwardly to slip the top inwardly of said turned down angular member between said vertical members, and said bottom then slipped inwardly to bring the container into a vertical position locked against the side panel.

2. The ballast of claim 1 having an opening in the top for filling the container, said opening being located so that it will be covered by the top portion of said side panel when the container is installed.

3. The ballast of claim 2 having an inner side ledge arranged to sit on a side ledge of the side panel of the truck.

4. The ballast container of claim 2 having dry, pourable sand therein.

5. The ballast of claim 3 having a recess in the bottom of said ledge adapted to sit over a short upwardly extending projection on the ledge of the truck to lock the ballast ledge in place.

6. The ballast of claim 1 having a recess in the bottom adapted to sit over a short upwardly extending projection on the floor of the truck to lock the bottom in place.

7. The ballast container of claim 5 wherein the major sides bend slightly when the container is filled to increase seating pressure on said ledge.

* * * * *